(12) United States Patent
Nichols et al.

(10) Patent No.: US 11,368,528 B2
(45) Date of Patent: Jun. 21, 2022

(54) DYNAMIC STORAGE MANAGEMENT IN CLOUD STORAGE SYNCHRONIZATION

(71) Applicant: MICROSOFT TECHNOLOGY LICENSING, LLC, Redmond, WA (US)

(72) Inventors: Jack Allen Nichols, Bothell, WA (US); Ed Averett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/271,199

(22) Filed: Sep. 20, 2016

(65) Prior Publication Data
US 2018/0084045 A1 Mar. 22, 2018

(51) Int. Cl.
*H04L 67/1097* (2022.01)
*H04L 67/1095* (2022.01)
(Continued)

(52) U.S. Cl.
CPC .......... *H04L 67/1095* (2013.01); *G06F 3/065* (2013.01); *G06F 3/0605* (2013.01); *G06F 3/067* (2013.01); *G06F 16/10* (2019.01); *G06F 16/11* (2019.01); *G06F 16/13* (2019.01); *G06F 16/178* (2019.01); *H04L 67/1097* (2013.01); *H04L 67/06* (2013.01)

(58) Field of Classification Search
CPC .................................................. H04L 67/1095
USPC ................................................. 709/217, 203
See application file for complete search history.

(56) References Cited

U.S. PATENT DOCUMENTS

| 5,634,122 A | 5/1997 | Loucks et al. |
| 6,343,316 B1 * | 1/2002 | Sakata ................... G06Q 10/10 709/213 |

(Continued)

FOREIGN PATENT DOCUMENTS

| GB | 2504402 A | 1/2014 |
| WO | 2014178906 A1 | 11/2014 |

OTHER PUBLICATIONS

Johnson (https://medium.odrive.com/a-designers-gift-from-the-cloud-storage-gods-cdca39376858, published Jun. 22, 2016, accessed on Mar. 19, 2018).*

(Continued)

*Primary Examiner* — Suraj M Joshi
*Assistant Examiner* — Sherman Lin
(74) *Attorney, Agent, or Firm* — Michael Best & Friedrich LLP

(57) ABSTRACT

Dynamic storage management in cloud storage synchronization is provided. A limit may be specified for amount of data associated with hydrated content in local storage. Upon detecting the limit being exceeded, the system may automatically begin to dehydrate files in local storage and replace them with placeholder files. Placeholders may also be specified on by default and content may initially synchronize as placeholders. As the user hydrates content, some files that were previously hydrated may be reverted to the placeholder state as the limit for amount of data in local storage is approached or exceeded. In some examples, specific limits may not be defined, but content may be heuristically dehydrated based on usage and size. In yet another example, the synchronization and local content dehydration may be performed on a per-folder basis.

20 Claims, 8 Drawing Sheets

(51) Int. Cl.
*G06F 3/06* (2006.01)
*G06F 16/11* (2019.01)
*G06F 16/13* (2019.01)
*G06F 16/178* (2019.01)
*G06F 16/10* (2019.01)
*H04L 67/06* (2022.01)

(56) References Cited

U.S. PATENT DOCUMENTS

| | | | |
|---|---|---|---|
| 6,356,915 | B1 | 3/2002 | Chtchetkine et al. |
| 7,779,034 | B2 | 8/2010 | Pedersen et al. |
| 8,099,758 | B2 | 1/2012 | Schaefer et al. |
| 8,276,137 | B2 | 9/2012 | Doyle et al. |
| 8,412,754 | B2 | 4/2013 | Chen et al. |
| 8,706,971 | B1 | 4/2014 | Nayak |
| 8,751,604 | B2 | 6/2014 | Liebman |
| 8,768,898 | B1* | 7/2014 | Trimmer ............ G06F 16/1727 707/693 |
| 8,799,414 | B2 | 8/2014 | Taylor et al. |
| 8,880,580 | B2 | 11/2014 | Simmons et al. |
| 9,020,992 | B1 | 4/2015 | Gunda et al. |
| 9,069,829 | B2 | 6/2015 | Kwiatkowski et al. |
| 9,087,076 | B2 | 7/2015 | Nickolov et al. |
| 9,104,340 | B2 | 8/2015 | Prahlad et al. |
| 9,166,866 | B2 | 10/2015 | Novak et al. |
| 9,218,350 | B2 | 12/2015 | Novak et al. |
| 9,235,587 | B2 | 1/2016 | Hahn |
| 9,239,762 | B1 | 1/2016 | Gunda et al. |
| 9,239,860 | B1 | 1/2016 | Love et al. |
| 9,253,047 | B2 | 2/2016 | Mishra et al. |
| 9,396,209 | B2 | 7/2016 | Fukui et al. |
| 9,405,767 | B2 | 8/2016 | Novak et al. |
| 9,524,151 | B2 | 12/2016 | Chan et al. |
| 9,753,816 | B2 | 9/2017 | Mehta et al. |
| 2004/0019613 | A1 | 1/2004 | Jones et al. |
| 2004/0133545 | A1 | 7/2004 | Kiessig et al. |
| 2004/0162876 | A1* | 8/2004 | Kohavi ............ G06F 17/30943 709/203 |
| 2005/0223047 | A1 | 10/2005 | Shah et al. |
| 2006/0069662 | A1 | 3/2006 | Laborczfalvi et al. |
| 2006/0200570 | A1 | 9/2006 | Stirbu et al. |
| 2006/0259949 | A1 | 11/2006 | Schaefer et al. |
| 2007/0162419 | A1 | 7/2007 | Ahn et al. |
| 2007/0214128 | A1* | 9/2007 | Smith ................ G06F 17/3064 |
| 2009/0172274 | A1 | 7/2009 | Nochimowski et al. |
| 2009/0193107 | A1 | 7/2009 | Srinivasan et al. |
| 2009/0313702 | A1 | 12/2009 | Mandava |
| 2010/0030739 | A1 | 2/2010 | Lanjewar et al. |
| 2010/0293141 | A1* | 11/2010 | Anand ................ G06F 8/71 707/640 |
| 2011/0153697 | A1 | 6/2011 | Nickolov et al. |
| 2012/0017261 | A1 | 1/2012 | Lim |
| 2012/0179553 | A1 | 7/2012 | Duggal |
| 2013/0014047 | A1 | 1/2013 | Joo et al. |
| 2013/0185258 | A1 | 7/2013 | Bestler et al. |
| 2013/0226876 | A1 | 8/2013 | Gati et al. |
| 2013/0275375 | A1 | 10/2013 | Nickolov et al. |
| 2013/0339471 | A1 | 12/2013 | Bhargava et al. |
| 2014/0006465 | A1 | 1/2014 | Davis et al. |
| 2014/0032691 | A1 | 1/2014 | Barton et al. |
| 2014/0032758 | A1 | 1/2014 | Barton et al. |
| 2014/0259005 | A1 | 9/2014 | Jeffrey et al. |
| 2014/0289191 | A1 | 9/2014 | Chan et al. |
| 2014/0324776 | A1 | 10/2014 | Novak et al. |
| 2014/0324777 | A1* | 10/2014 | Novak ............ G06F 17/30153 707/624 |
| 2014/0324945 | A1 | 10/2014 | Novak et al. |
| 2014/0330874 | A1 | 11/2014 | Novak et al. |
| 2014/0337577 | A1 | 11/2014 | Burton et al. |
| 2014/0358860 | A1 | 12/2014 | Wautier et al. |
| 2014/0372376 | A1 | 12/2014 | Smith et al. |
| 2015/0012495 | A1 | 1/2015 | Prahlad et al. |
| 2015/0052105 | A1 | 2/2015 | Nguyen |
| 2015/0067005 | A1 | 3/2015 | Avati |
| 2015/0254119 | A1 | 9/2015 | Gallardo et al. |
| 2015/0347447 | A1 | 12/2015 | Ho et al. |
| 2016/0063027 | A1 | 3/2016 | Brand |
| 2016/0192178 | A1* | 6/2016 | Blong ............ G06F 3/067 455/418 |
| 2016/0291856 | A1* | 10/2016 | von Muhlen ....... G06F 3/04817 |
| 2016/0330256 | A1 | 11/2016 | Novak et al. |
| 2016/0359949 | A1* | 12/2016 | Hess ................ H04L 67/06 |
| 2017/0075907 | A1 | 3/2017 | Goswami et al. |
| 2017/0251257 | A1 | 8/2017 | Obrien |
| 2018/0039652 | A1 | 2/2018 | Nichols |
| 2018/0041418 | A1 | 2/2018 | Abe et al. |
| 2018/0046635 | A1 | 2/2018 | Nichols |
| 2018/0060345 | A1 | 3/2018 | Christiansen et al. |
| 2018/0084044 | A1 | 3/2018 | Nichols et al. |
| 2018/0246905 | A1 | 8/2018 | Besen et al. |
| 2018/0329923 | A1 | 11/2018 | Brand |
| 2019/0272253 | A1 | 9/2019 | Vibhor et al. |

OTHER PUBLICATIONS

"International Search Report and Written Opinion Issued in PCT Application No. PCT/US2017/051242", dated Nov. 20, 2017, 11 Pages.

"Sync infinite cloud storage", Retrieved on: Jul. 13, 2016 Available at https://www.odrive.com/features/sync.

"How do I save space on my computer with selective sync?", Published on: Sep. 18, 2015 Available at https://www.dropbox.com/en/help/175.

"Goodsync Key feature", Published on: Feb. 4, 2015 Available at: http://www.goodsync.com/features.

"Orchestration Dehydration and Rehydration", Published on: Feb. 27, 2009 Available at https://msdn.microsoft.com/en-us/library/aa995563.aspx.

"Set the default open behavior for browser-enabled documents (Office Web Apps when used with SharePoint 2013)", Retrived From: https://web.archive.org/web/20140205120234/https://technet.microsoft.com/en-us/library/ee837425.aspx, Nov. 13, 2012, 3 Pages.

"Non Final Action Issued in U.S. Appl. No. 15/225,851", dated Dec. 3, 2018, 37 Pages.

Azab, et al., "Stroll: A Universal Filesystem-Based Interface for Seamless Task Deployment in Grid Computing", In Proceedings of the Distributed Applications and Interoperable Systems, Jun. 13, 2012, pp. 162-176.

Cohen, Peter, "How to save disk space on your Mac by selectively syncing Dropbox folders", Retrieved From http://www.imore.com/how-save-disk-space-your-mac-selectively-syncing-dropbox-folders, Apr. 23, 2014, 5 Pages.

Huculak, Mauro, "How to overcome the placeholder limitation of OneDrive in Windows 10", Retrieved from: https://www.windowscentral.com/fix-placeholder-limitation-onedrive-windows-10, Sep. 4, 2015, 4 Pages.

Paul, Ian, "How to use Google Drive's selective sync", Retrieved From: http://www.pcworld.com/article/3057217/google-apps/how-to-use-google-drives-selective-sync.html, Apr. 19, 2016, 4 Pages.

"International Search Report and Written Opinion Issued in PCT Application No. PCT/US17/051243", dated Nov. 9, 2017, 13 Pages.

"International Search Report and Written Opinion Issued in PCT Application No. PCT/US2017/043820", dated Oct. 17, 2017, 14 Pages.

Rubino, Daniel, "Microsoft responds to Windows 10 OneDrive 'selective sync' controversy", Retrieved From: https://www.windowscentral.com/microsoft-responds-windows-10-onedrive-selective-sync, Nov. 14, 2014, 3 Pages.

Shan, et al., "An Overlay File System for Cloud-Assisted Mobile Applications", In Proceedings of the 32nd Symposium on Mass Storage Systems and Technologies, May 2, 2016, 14 Pages.

Thurrot, Paul, "OneDrive Tip: Use Documents and Other Libraries with OneDrive", Retrieved From: https://www.thurrott.com/cloud/microsoft-consumer-services/onedrive/1646/onedrive-tip-use-documents-and-other-libraries-with-onedrive, Feb. 28, 2015, 9 pages.

Zhao, et al., "HyCache: a User-Level Caching Middleware for Distributed File Systems", In Proceedings of IEEE 27th Interna-

(56) References Cited

OTHER PUBLICATIONS tional Symposium on Parallel & Distributed Processing Workshops and PhD Forum, May 20, 2013, pp. 1997-2006.
"Non Final Office Action in U.S. Appl. No. 15/271,185", dated Jan. 11, 2019, 14 Pages.
"Final Office Action Issued in U.S. Appl. No. 15/271,185", dated Jul. 22, 2019, 16 Pages.
"Final Office Action Issued in U.S. Appl. No. 15/225,851", dated Jun. 13, 2019, 33 Pages.
"Advisory Action Issued in U.S. Appl. No. 15/225,851", dated Sep. 26, 2019, 6 Pages.
"Notice of Allowance Issued in U.S. Appl. No. 15/271,185", dated Dec. 12, 2019, 10 Pages.
"Non Final Office Action Issued in U.S. Appl. No. 15/225,851", dated Apr. 7, 2020, 31 Pages.
"Office Action Issued in European Patent Application No. 17777446.0", dated Jan. 27, 2021, 8 Pages.
"Final Office Action Issued in U.S. Appl. No. 15/225,851", dated Sep. 24, 2020, 36 Pages.
"Advisory Action Issued in U.S. Appl. No. 15/225,851", dated Dec. 31, 2020, 6 Pages.
"Final Office Action Issued in U.S. Appl. No. 15/225,851", dated Oct. 18, 2021, 36 Pages.
"Non Final Office Action Issued in U.S. Appl. No. 15/225,851", dated Jun. 25, 2021, 33 Pages.
"Office Action Issued in Indian Patent Application No. 201947008341", dated Jul. 13, 2021, 7 Pages.
"Office Action Issued in European Patent Application No. 17749271.7", dated Dec. 15, 2021, 8 Pages.
"Notice of Allowance Issued in European Patent Application No. 17777446.0" dated Mar. 2, 2022, 7 Pages.

* cited by examiner

DYNAMIC STORAGE MANAGEMENT IN CLOUD STORAGE SYNCHRONIZATION

BACKGROUND

Placeholder are a synchronization engine feature that provide a means when a user warns to synchronize more content than the may have disk space for, when the user wants to allocate space for other things, policy, and so on. Instead of synchronizing an entire file, a small "placeholder" file may be synchronized instead. When the user interacts with the file, the synchronization engine may download (or "hydrate") the contents to disk just in time. The effect is that the user may see their entire namespace, regardless of disk space, and can interact with their files as normal, as long as they are online. One aspect of placeholders is that there is minimal (if any) application compatibility work, as aside from slow opens and reads, applications are largely unaware that files are hydrated just-in-time.

Over time, as users open more and more files, their local storage may become full. In such situations, users may need to identify the problem, and then explicitly ask the synchronization engine to correct it by "dehydrating" or replacing with placeholder files some of the files that are in local storage. Both operations may be complicated for the average user to undertake.

SUMMARY

This summary is provided to introduce a selection of concepts in a simplified form that are further described below to the Detailed Description. This summary is not intended to exclusively identify key features or essential features of the claimed subject matter, nor is it intended as an aid in determining the scope of the claimed subject matter.

Embodiments are directed to providing dynamic storage management in cloud storage synchronization. In some examples, a need to reduce hydrated content from a local storage may be determined. One or more files in local storage to be dehydrated may also be determined based on one or more policies, and the one or more files may be dehydrated by replacing the one or more files with placeholders indicating corresponding one or more files in a cloud storage and removing the one or more files in the local storage. Optionally, one or more placeholders in the local storage may then be allowed to be hydrated.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
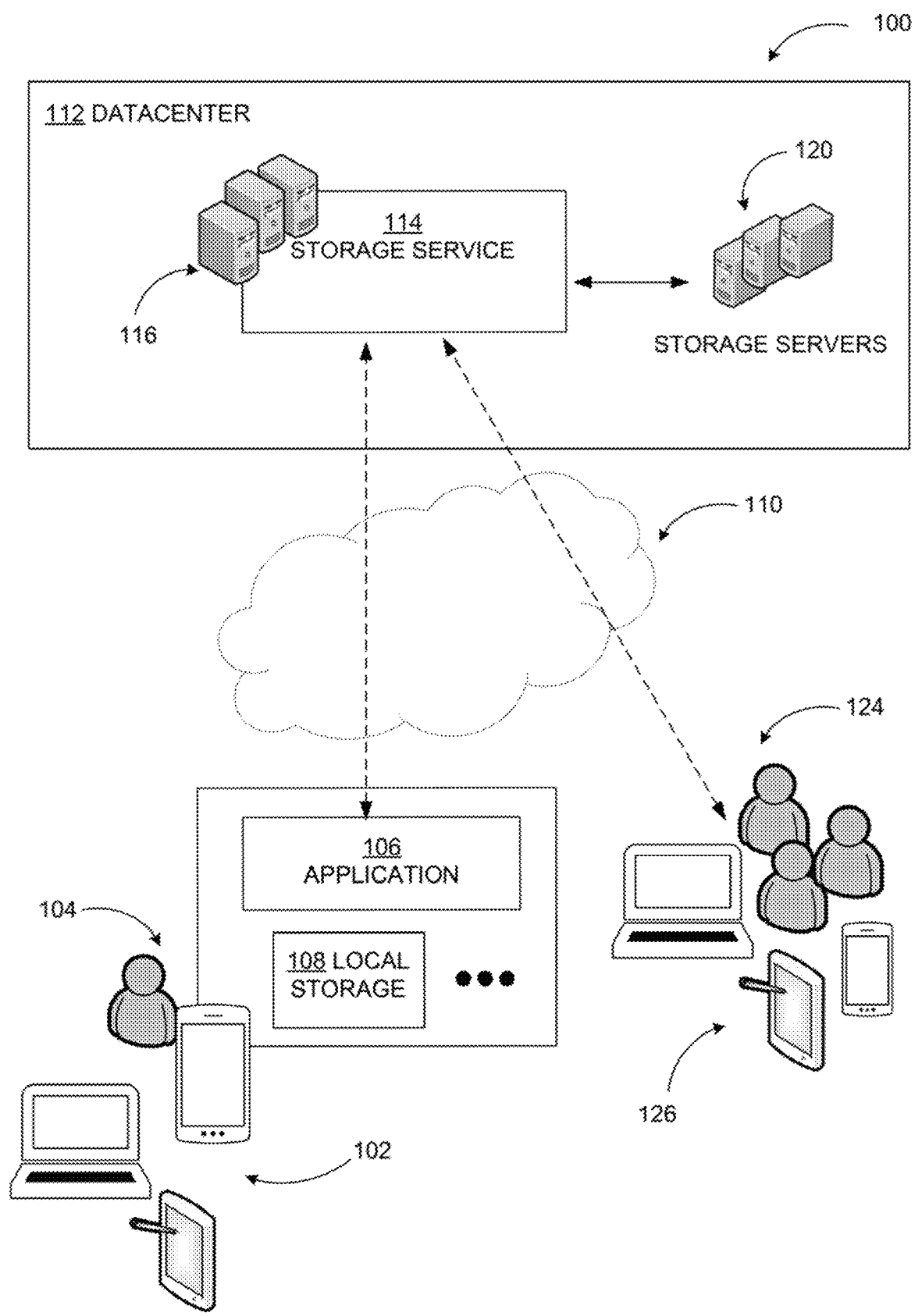
FIG. 1 includes an example network environment where a system to provide dynamic storage management in cloud storage synchronization may be implemented.

As briefly described above, embodiments are directed to dynamic storage management in cloud storage synchronization. To prevent overloading of local storage with hydrated placeholder files, dynamic decisions may be made when to dehydrate files in local storage and which files to dehydrate. In one example, a limit may be set for amount of data associated with hydrated content in local storage by a user or an administrator. Upon detecting the limit being exceeded, the system may automatically begin to dehydrate files in local storage and replace them with placeholder flies. In another example, the user or the administrator may specify that placeholders are on by default and content may initially synchronize as placeholders. As the user hydrates content, some files that were previously hydra ted may be reverted to the placeholder state as the limit for amount of data associated with hydrated content in local storage is approached or exceeded. In a further example, a specific limit may not be defined, but content may be heuristically dehydrated based on usage and size. For example, a user that actively uses their cloud storage may have more content synchronized locally than a user who only uses their cloud storage occasionally. In yet another example, the synchronization and local, content dehydration may be performed on a per-folder basis. For example, a camera roll folder may be associated with a policy such that new photos are immediately uploaded and dehydrated, and stored only in the cloud. In each of the example scenarios above, synchronization and/or dehydration actions may be performed automatically based on default and/or customizable rules (policies), user input, or a combination of both. While placeholders are used as illustrative examples, embodiments may also be implemented in non-placeholder scenarios such as selective synchronization.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled m the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located m both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example processes). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout ibis specification, the term "platform" may be a combination of software and hardware components for providing dynamic storage management in cloud storage synchronization. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to provide dynamic storage management in cloud storage synchronization may be implemented.

As illustrated in diagram 100, an example system may include a datacenter 112 hosting a cloud-based storage service 114 configured to provide storage for and enable sharing of content that may be accessed across multiple devices and users. The datacenter 112 may include one or more processing servers 116 configured to execute the storage service 114, among other components. In some embodiments, at least one of the processing servers 116 may be operable to manage the storage service 114, where data from devices (such as devices 122, 126) may be synchronized with the cloud stored date at storage servers 120 (or associated data stores). As described herein, the storage service 114 may be implemented as software, hardware, or combinations thereof.

In some embodiments, the storage service 114 may be configured to in temperate with various applications to synchronize files stored locally on user associated devices with the same files stored remotely at the storage service 114. For example, as illustrated in the diagram 100, a user 104 may execute a thin (e.g., a web browser) or a thick (e.g., a locally installed client application) version of an application 106 through the device 102 with which the storage service 114 may be configured to integrate and intemperate with over one or more networks, such as network 110. The application 106 may be an application hosted by the storage service, such as a synchronization client, for example. The device 102 may include a desktop computer, a laptop computer, a tablet computer, a vehicle mount computer, a smart phone, or a wearable computing device among other similar devices. A communication interface may facilitate communication between the storage service 114 and the application 106 over the network 110.

In an example embodiment, the storage service 114 may be configured to receive content stored on local storage 108 of the device 102. The received content may be stored remotely at the storage service 114 within the storage servers 120, for example. Periodic synchronization between the content stored on local storage 108 of the device 102 and the convent stored remotely at the storage service 114 may be performed to ensure a most updated version of the content is stored and/or shared at each location.

To prevent exceeding available storage space at a local storage (e.g., on device 102), hydrated content at the local storage (placeholders converted to downloaded files, for example) may be dehydrated based on specified limits for storage, heuristics, or similar approaches. Content to be dehydrated may be selected based relevance to user, usage history, specified parameters, and so on.

As local placeholders are hydrated automatically or upon user action, local storage space may be used up. Thus, users may have to deal with complex systems/approaches to open local storage space for additional hydration actions. A system according to embodiments allows dynamic storage management in cloud storage synchronization. By dehydrating local content automatically increased efficiency, reduced local computing resource usage, and increased security and collaboration may be achieved.

Embodiments, as described herein, address a need that arises from very large scale of operations created by software-based services that cannot be managed by humans. The actions/operations described hereto are not a mere use of a computer, but address results of a system that is a direct consequence of software used as a service offered in conjunction with large numbers of devices and users storing and/or sharing content both locally at client devices and remotely at cloud-based storage services.

Figure 2:
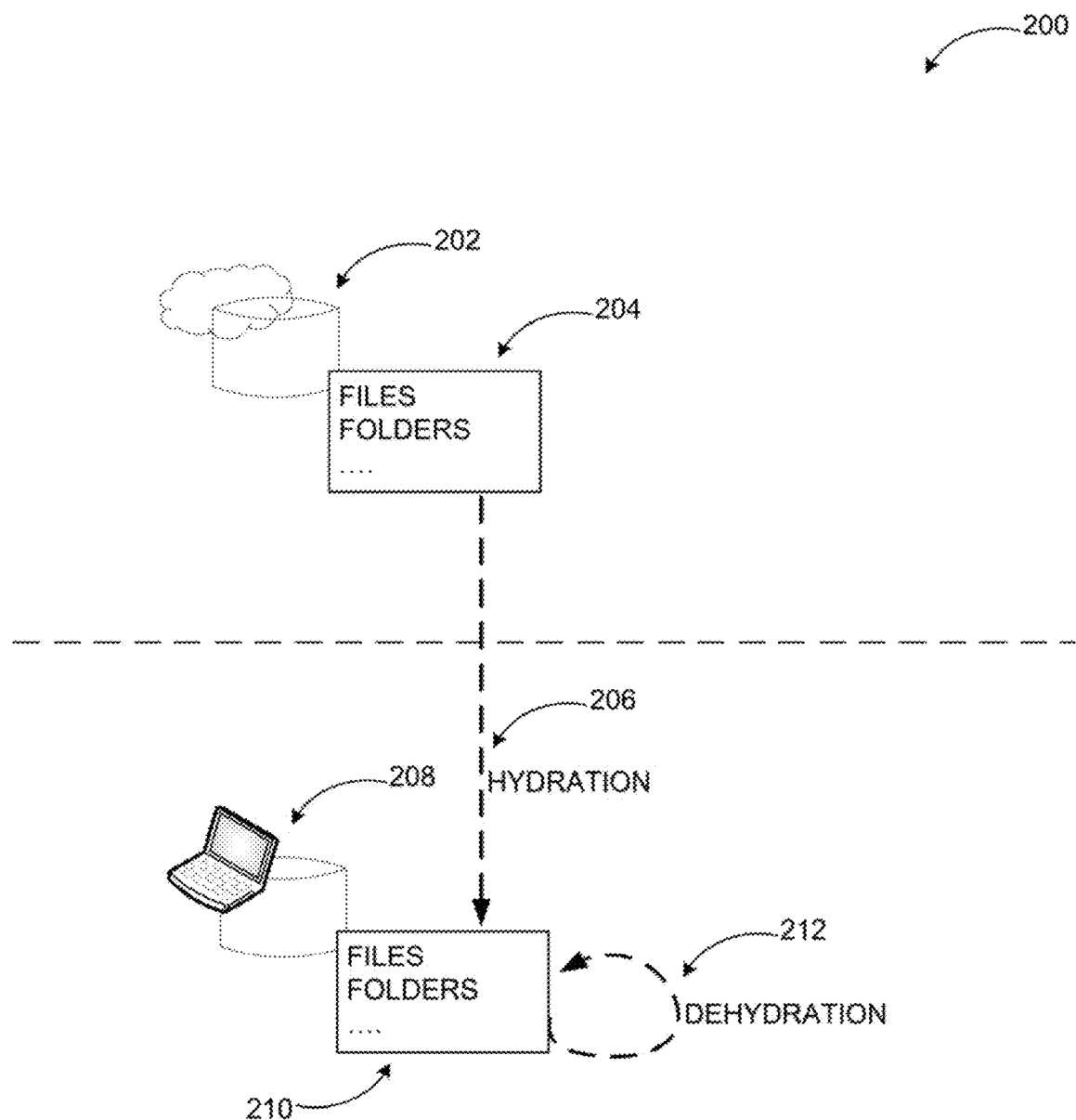
FIG. 2 illustrates conceptually dynamic storage management in cloud storage synchronization.

FIG. 2 illustrates conceptually dynamic storage management in cloud storage synchronization.

In some scenarios, a synchronization engine may have more data in the cloud storage than is represented on disk (local storage). For example, some devices may only have a few hundred MB of storage available, but the user may have a terabyte of data in the cloud. In conventional approaches, users typically select which content to synchronize onto their device. Thus, content the user did not choose to synchronize is invisible except on the cloud. Placeholders may allow users to see the entire content of their cloud storage on their local disk. Some files, called placeholders, are metadata-only representations of their cloud stored counterpart. When the user accesses, reads, or copies the file, the content is downloaded to the local disk "just in time". On a fast network, it may appear to the user as if their entire drive is present on disk. Over time, as users open more and more files, their local storage may become full. In this situation, users may have to identify the problem, and then explicitly instruct the synchronization engine to correct the situation by "dehydrating" some of the files that are on disk.

As shown in diagram 200, content 204 in cloud storage 202 such as files, folders, and other forms of data may be synchronized selectively to content 210 at local storage. In a system that uses placeholders, the synchronization may involve hydration 206, where selected placeholder files may be replaced with downloaded content. As local storage space is reduced, a need to create more local storage space may be determined based on specified size limits or through a heuristic mechanism, and previously hydrated content may be dehydrated 212 (removed from local storage and replaced with placeholders).

Thus, in a system according to embodiments, a need to create local storage space may need to be detected first, and which files, folders, or similar data to dehydrate may need to be determined next. Determining need for additional space based on currently stored files in local storage may not be an easy task. Most file systems may not be able to quickly determine the on-disk size of a folder. In many implementations, the system may need to enumerate the contents of a folder, and sum the sizes of each component. If the folder contains another folder, this process typically needs to be performed recursively. For large hierarchies, the process may be resource expensive and impractical.

In some synchronization engine implementations, detection may occur when realization is complete; that is, after the synchronization engine completes synchronizing content from the cloud storage, including receiving acknowledgement of newly uploaded content. Other implementations may lack such a component and may instead perform detection on each disk operation. Thus, a resource-inexpensive and frequently repeatable process may be employed. Following is such an example process: A "hydrated size" field may be maintained it) a database to keep track of the data (e.g., total number of bytes) hydrated on local storage. Upon each full realization of a file from the cloud storage, the hydrated size Held may be updated. When a file is dehydrated or removed, its size may be subtracted from the field. In some implementations, the field may not be updated until the file is fully synchronized; that is, is local storage changes have not yet been sent to the cloud storage, in some examples, synchronization diagnostics may be performed regularly (e.g., once a day), and the on-disk size may be verified by comparison to the hydrated size, and the hydrated size updated if needed.

In addition to determining when dehydration is needed, a system according to embodiments may also determine which data (e.g., files or folders) to dehydrate. Default, customizable, or dynamic rules for selecting data to dehydrate may be based on relevance to the user, usage history, size, time of hydration, and similar factors.

In some embodiments, policies may be used that define how to detect the need for dehydration, which files to dehydrate, and other optional operations. The policies may vary depending on types of operating system, cloud storage, local storage, organizational rules, user preferences, and comparable parameters. An example policy may permit at most 100 GB of hydrated content on disk, or 50% of the user's total cloud size, whichever is smaller; consider files not accessed for 7 days to be eligible for dehydration; consider files accessed fewer than 10 times in the last 30 days to be eligible for dehydration; consider files with a service rank less than 5.5 to be eligible for dehydration; and explicitly exclude .pst and .psd files from being automatically dehydrated. As can be seen from the example policy, need to dehydrate may be determined based on a limit specified for hydrated files in the local storage or the size of hydrated files in local storage not exceeding a portion of the size of cloud storage. Files to be dehydrated may be selected based on multiple criteria such as last access, frequency of access, file type, and a ranking. The ranking may be based on an application (e.g., a personalized search application) determination of a file's relevance to the user. Certain file types may also be explicitly included or excluded from consideration.

Some exceptions may be made to the rules above. In some cases, a synchronization engine may need to designate some files for short term persistence, no matter if they match the rules or not. Some examples of this may include files that are in use by another application, files that are deemed "hot" by the synchronization engine, and files that the user has explicitly designated as short term. Such files may not be dehydrated until an associated short term flag clears. One way to persist the short term flag may include adding a record in the synchronization engine's database that identifies the file as short term. If this flag exists, the algorithms for selecting files to dehydrate may not dehydrate the file. The synchronization engine may be responsible for defining the rules as to when the short term flag is set and cleared.

Figure 3:
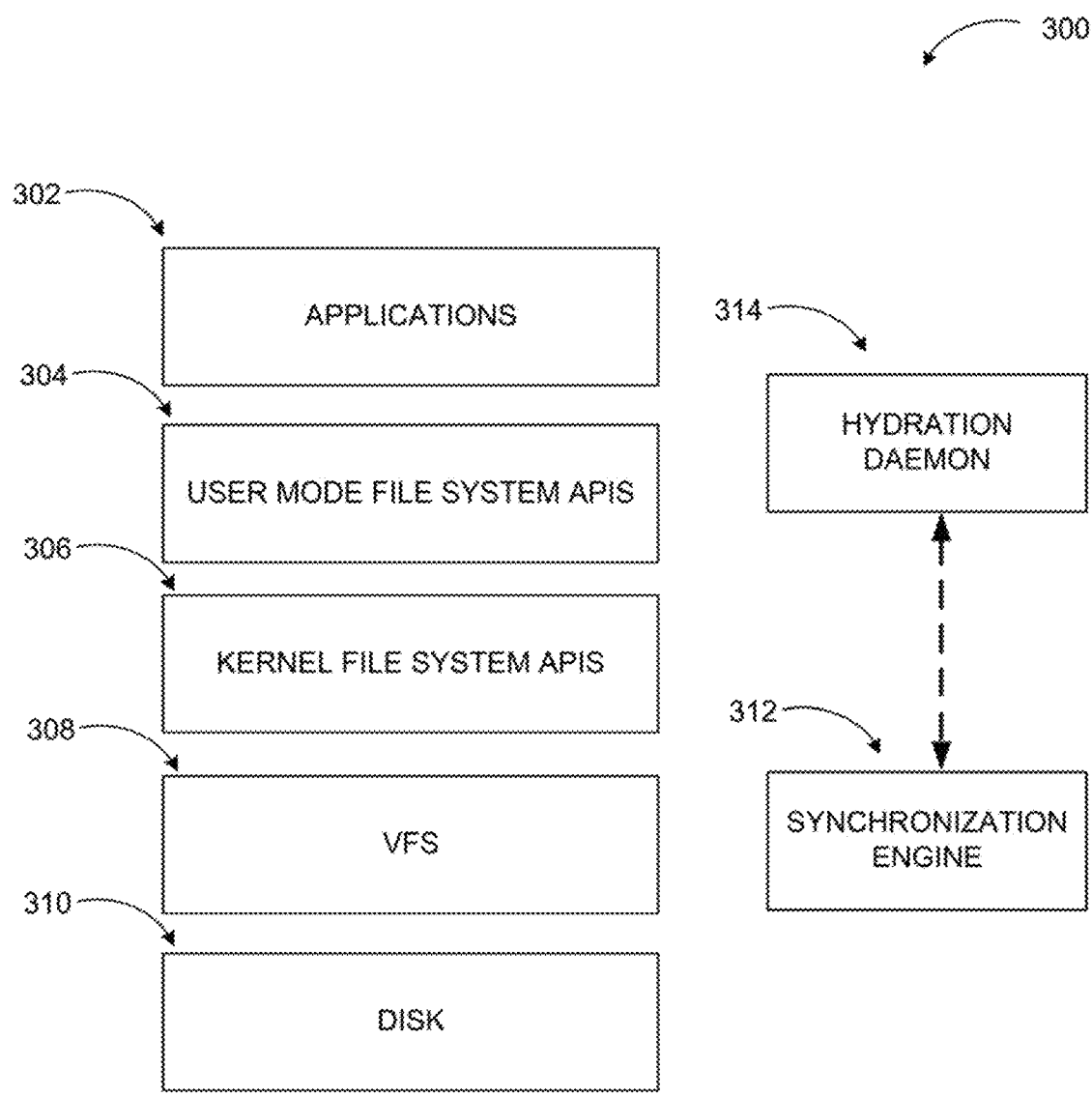
FIG. 3 illustrates example layers of an operating system that may utilize placeholders tor cloud storage synchronization.

FIG. 3 illustrates example layer of an operating system that may utilize placeholders for cloud storage synchronization.

As shown in diagram 300, a typical stack may include applications 302, user mode file system application programming interfaces (APIs) 304, kernel file system APIs 306, virtual file system (VFS) 308, and disk 310. Placeholders (metadata files that include pointers to a cloud storage location of a file) may be implemented in a variety of ways in conjunction with a stack like the one shown in diagram 300. For example, a mini-filler driver system (placeholder code) may be provided between the user mode file system APIs layer 304 and kernel file system APIs layer 306 in an operating system such as Windows® operating systems by MICROSOFT CORP. of Redmond, Wash., and allow third parties to inject code between the file system and the user mode file system APIs. This may provide the means to intercept file open, read, and write requests, hand then off to the synchronization engine, allow the synchronization engine to download the file, and fulfill the original open, read, or write request.

Some operating systems may not allow the placeholder code to be injected between the user mode file system APIs 304 and kernel file system APIs 306. Thus, the code may be inserted either in the applications layer 302 or the VFS layer 308 above die disk 310. Special ".placeholder" files that are associated with a hydration application may be created for example. The user may activate a ".placeholder" file, the hydration application may open and hydrate the file, and then launch the default application associated with the newly hydrated file. In other implementations, bidirectional links may be used in conjunction with the synchronization engine 312 and hydration daemon 314 to allow synchronization of files represented by placeholders at the local storage. VFS is designed to abstract the details of how files are accessed and stored from the rest of the system. To kernel-space or user-space, the VFS presents an interface that deals in terms of paths and file handles. Internally, VFS may maintain significant state, and read and write blocks on disk in any way it sees fit. VFS implementations may also abstract network file systems, devices, processes, and more.

According to some embodiments, a dehydration process may be coordinated with the synchronization engine 312 based on detecting a limit for local storage being approached or exceeded (or heuristically determining) and selecting files or folders to dehydrate based on any number of criteria/input and exceptions.

Figure 4:
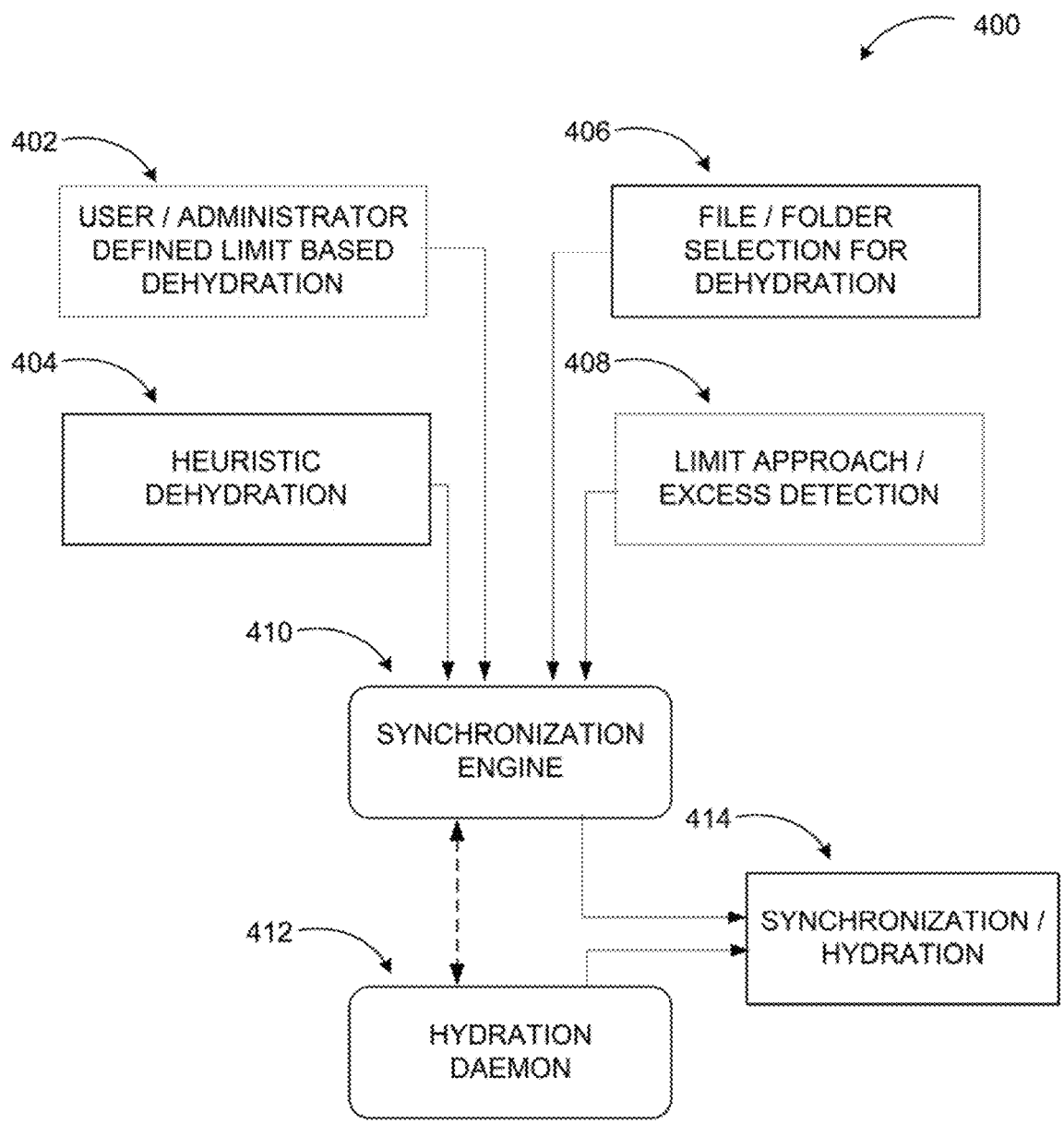
FIG. 4 illustrates example operations in providing dynamic storage management in cloud storage synchronization.

FIG. 4 illustrates example operations in providing dynamic storage management in cloud storage synchronization.

Diagram 400 shows some example operations that may be employed in determining when to dehydrate local storage and which files/folders to select for dehydration. Algorithms may be used to determine a need for dehydration based on user or administrator defined limits (402) or heuristic determination (404). Based on the policies defining how to determine the need for dehydration (408), a detection may be based on a limit (e.g., amount of hydrated files, amount of total data, etc.) being approached or exceeded, files and/or folders may be selected for dehydration (406) based on one or more criteria. Selected files folders may then be dehydrated, that is, replaced with placeholders and removed from local storage to make room for new files to be hydrated.

In some embodiments, synchronization engine 410, which may hydrate files in conjunction with hydration daemon 412 performing the synchronization/hydration process 414, may be used to perform the dehydration process as well.

As discussed above, with a detection mechanism and policy in place, one or more algorithms may be executed when the detection threshold is reached. In some examples, which files to dehydrate may be decided based on a last access time of a file, a number of times the file is opened by the user, a size of the file, a type of the file (some file types may be less frequently modified, or some may be excluded entirely, for example), a relevance or service ranking for the file, and similar parameters. Based on these parameters, an algorithm may rank files in order of best to worst candidates for being on local storage. The algorithm for determining which files are to be dehydrated may provide as output a list of files eligible for dehydration. The synchronization engine may dehydrate the files based on the list. Ranking of files for dehydration may be performed by one or multiple algorithms. The ones discussed herein are examples for illustration purposes.

Dehydration determining algorithms may receive as input a list of files eligible for dehydration. This list may be an entire set of files in the user's scope, but may be filtered based on rules and other factors. In some examples, a pre-filter algorithm to narrow the scope of eligible files may be executed before any algorithm runs. Following is an illustrative example pre-filter algorithm:

```
Let F = { }    // List of files to send to the algorithm
For each file
{
  if (the file matches an exclusion rule)
    skip the file
  if (the file type is marked short term)
    skip the file
  if (the file has been modified sooner than the access time rule)
    skip the file
  if (the file has been modified more than N times in M days)
    skip the file
  if (the file has a rank more than R)
    skip the file
  add the file to F
}
Return F
```

The example pre-filter algorithm may return F, a set of files eligible for dehydration. The total size of files in F may be less than the size needed to remove in order to meet the size constraints specified in a policy. In such a scenario, the synchronization engine may decide how to handle this case. For example, the synchronization engine may modify the policy values and try again. The synchronization engine may also ignore the constraint, and potentially alert the user or the administrator.

Selecting a target size that both meets the constraints specified in the policy and ensures that the dehydration algorithm does not have to be executed repeatedly may increase an efficiency of the system. For example, selecting exactly the amount specified in the policy may cause the dehydration algorithm to execute every time a file is subsequently hydrated. For this reason, the policy may specify an offset value that the target is modified by. Assuming the target size is 100 GB, with an offset of 15%, for example, the target, for the dehydration algorithm may be 85 GB, to allow for some re-growth after executing the algorithm.

Following is an example algorithm to dehydrate files based on some of the example rules discussed herein:

```
Let L = 0
Let X = 0
Let F = { . . . } // A list of files from the pre-filter
Let R = { } The output list of files to dehydrate
L = determine the hydrated size to reduce, based on policy
Rank all files in F by size descending, timestamp descending
For each file in F
{
  // If we have exceeded the amount we need to reduce,
  we're done
  if (X > L)
    exit loop
  Add the file to F
  X += size of file
  Go to the next file
}
if (X < L)
Return F
```

The example algorithm has the property of treating the disk as a cache for the cloud storage, and reducing content (by dehydration) that has not been used or accessed recently. Such an algorithm may be efficient in cases where the focal storage starts out as all placeholders, and over time hydration occurs. It may also be effective in cases where the user's content is fully hydrated, but occupies substantially less than the target size.

In some examples, an algorithm may also consider whether files should be hydrated, as well as dehydrated. Considering a scenario in which the user has content C of size X that is substantially less than target L, it mas be desirable to proactively hydrate files to disk given that the user has a sizeable amount of disk space available. Such an algorithm may take into consideration a number of factors such as should one large file or several small files be hydrated, should files that are located near other hydrated files be hydrated, should one type of file be preferred over another, and so on. Near in this case may mean located on adjacent disk sectors (spinning disks) or in the same folder as other files.

The example algorithm below is aimed at optimizing hydration of more small files by locating files within the same folder as other hydrated files. Such an algorithm may be designed to address a photo preview situation, where the user may browse to multiple files quickly within the same folder. The algorithm may also try to hydrate at least a minimum number of bytes, and may optionally hydrate files up to the target.

```
Let X = 0
Let F = { . . . } // A list of all files (assuming no pre-filter algorithm)
Let D = { } // The output list of files to dehydrate
Let H = { } // The output list of files to hydrate
Let Z = { } // A list of files for which we have no preference
```

-continued

```
Let K = maximum size of file to hydrate, based on policy
Let L = determine the max hydrated size, based on policy
Let M = minimum number of bytes to hydrate, based on policy
Sort all files in F by size ascending, timestamp descending
For each file in F
{
   Let P = file's parent folder
   if (X > L)
   {
      // If the target size is exceeded, add the remaining
// files to D, as no more files can fit into the hydrate list.
      Add the file to D
   }
   else if (size of file > K)
   {
      // If the file is bigger than a policy constraint,
      // add it to the dehydrate list
      Add the file to D
   }
   else if (P contains at least one hydrated file)
   {
      // If there is already at least one hydrated file in this folder
      Add the file to H
      X += size of file
   }
   else if (X < M)
   {
      // Enough bytes have not been hydrated yet, so hydrate this file
      Add the file to H
      X += size of file
   }
   else
   {
      // Enough bytes have been hydrated to meet the minimum,
      but are still
      // below the maximum. Add this to the "no preference" list.
      Add the file to Z
   }
}
// Dehydrate the files in D
Run SizeFirstDehydration(D) // for example, the ranking algorithm
above //
// Hydrate the files in H
For each file in H
{
   Hydrate(H)
}
```

Figure 5:
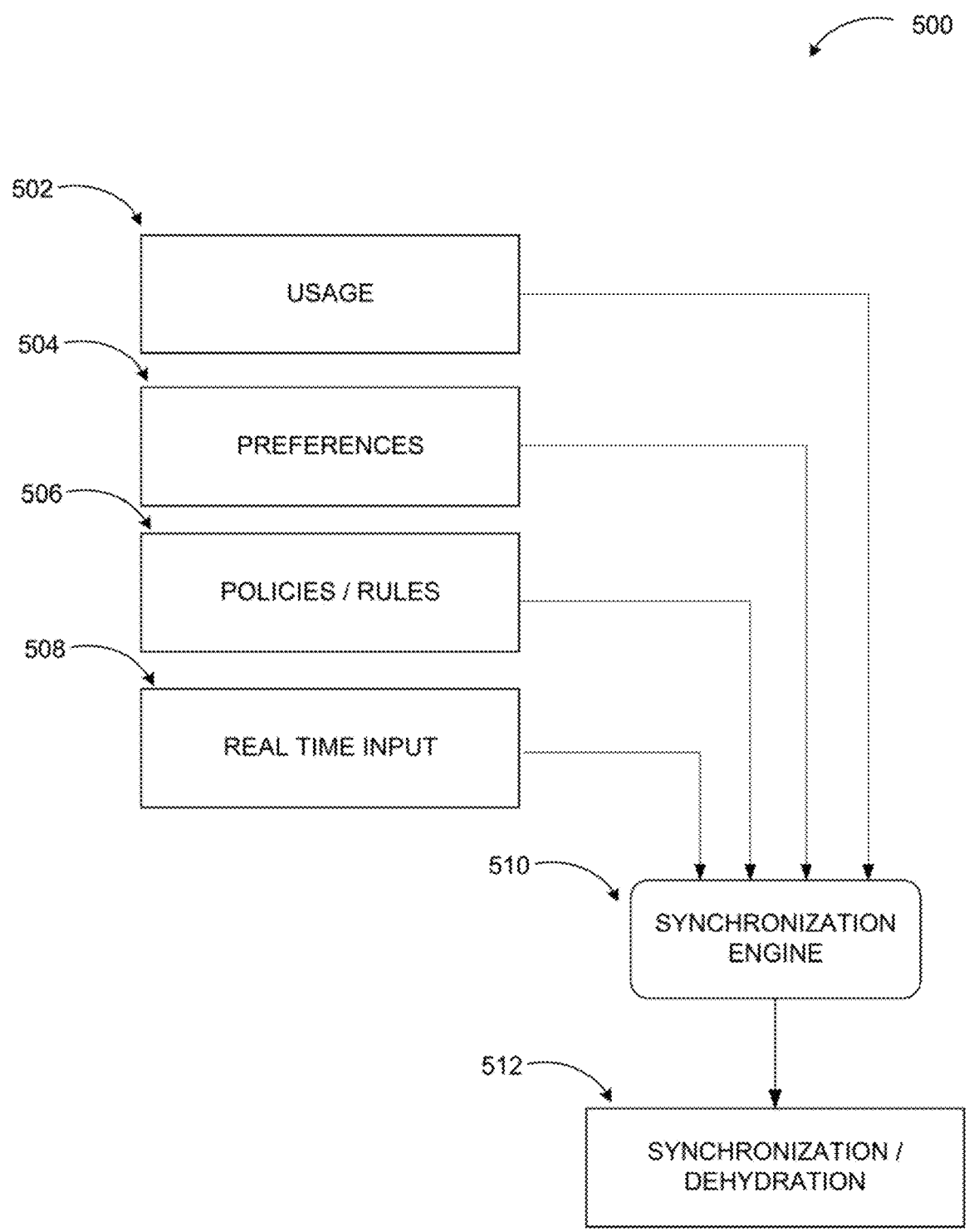
FIG. 5 illustrates example inputs used by a synchronization engine in providing dynamic storage management in cloud storage synchronization.

FIG. 5 illustrates example inputs used by a synchronization engine in providing dynamic storage management in cloud storage synchronization.

As shown in diagram 500, policies and rules 506 may control a synchronization and/or dehydration process 512 executed by a synchronization engine 510. The policies and rules 506 may define criteria based on usage 503 and/or preferences 504. For example, files to be dehydrated may be selected based on user's access (recent, frequent, etc.) or explicit preferences. Organizational policies may also be incorporated into hydration/dehydration rules. In some examples, users or administrators, may be prompted to provide input for implementation of certain policies or rules. For example, flies determined be least relevant to a user may be confirmed by prompting user input before being dehydrated.

The examples provided in FIGS. 1 through 5 are illustrated with specific systems, services, applications, modules, codes, and notifications. Embodiments are not limited to environments according to these examples. Dynamic storage management in cloud storage synchronization may be implemented in environments employing fewer or additional systems, services, applications, engines, codes, and user experience configurations. Furthermore, the example systems, services, applications, modules, and notifications shown in FIG. 1 through 5 may be implemented in a similar manner with other values using the principles described herein.

Figure 6:
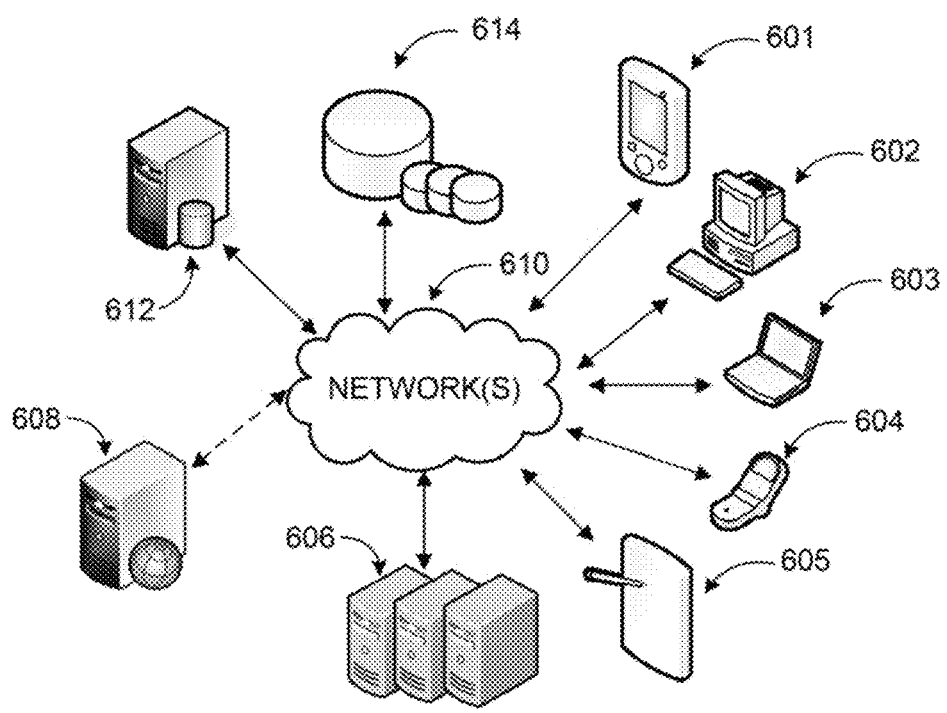
FIG. 6 is a networked environment where a system according to embodiments may be implemented.

FIG. 6 is a networked environment, where a system according to embodiments may be implemented. In addition to locally installed applications (for example, application 106 or synchronization client 206), dynamic storage management in cloud storage synchronization may also be employed in conjunction with hosted applications and services (for example, a storage service 114) that may be implemented via software executed over one or more servers 606, individual server 608, or at client devices, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data such as cloud stored versions of the files may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for dynamic storage management in cloud storage synchronization. Furthermore, the networked environments discussed in FIG. 6 are for illustration purposes only. Embodiments are not limited to the example applications, engines, or processes.

Figure 7:
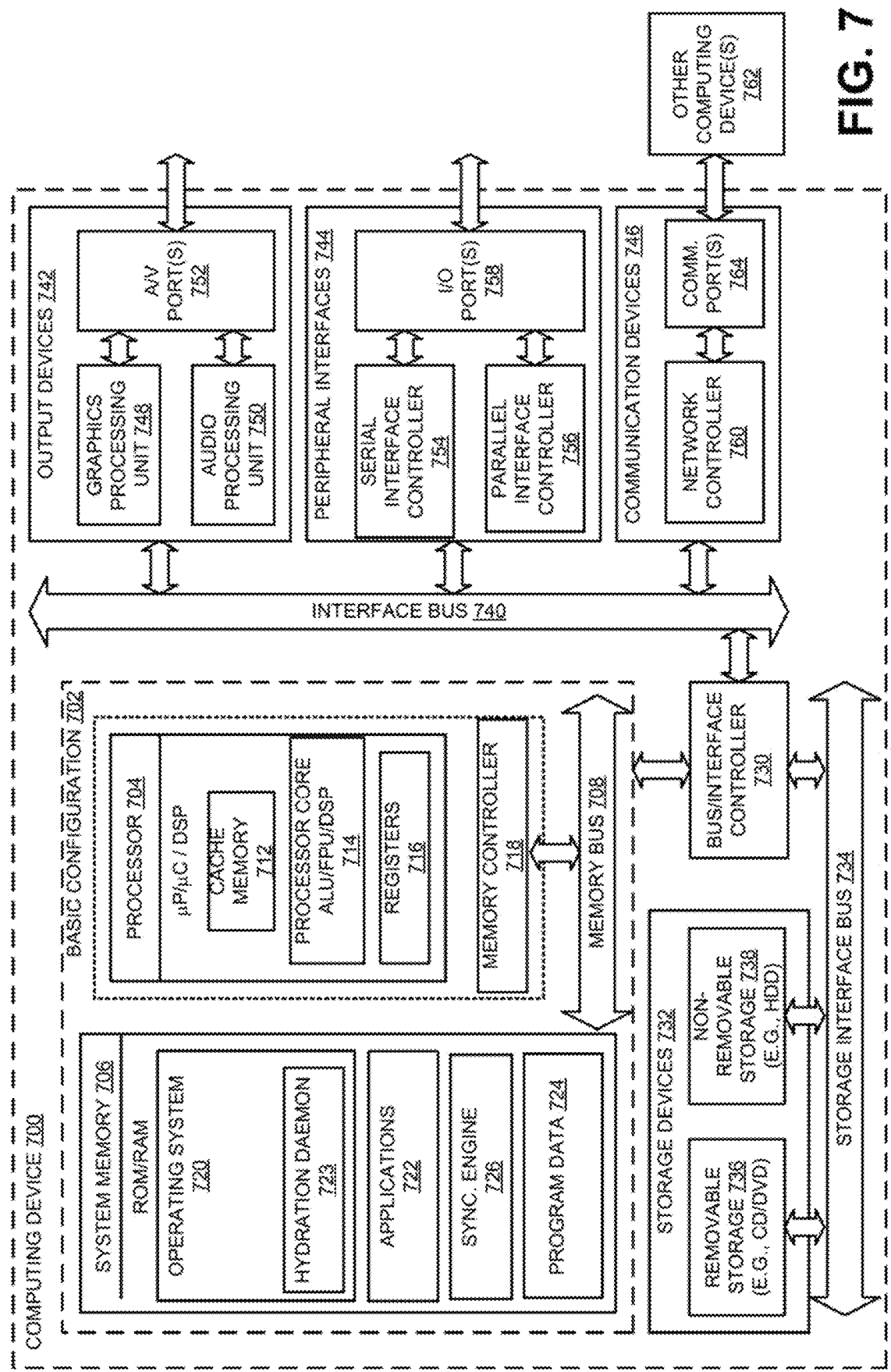
FIG. 7 is a block diagram of an example general purpose computing device, which may be used to provide dynamic storage management in cloud storage synchronization.

FIG. 7 is a block diagram of an example general purpose computing device, which may be used to provide dynamic storage management in cloud storage synchronization.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, one or more applications 722, a synchronization engine 726, and program data 724. The synchronization engine 726 may synchronize files between a local storage and a cloud storage. The operating system 720 may include a hydration daemon 723 to provide hydration of placeholders m synchronization of files. The program data 724 may include, among other data, local versions of cloud stored files, as described herein.

The computing device 700 may have additional feature or functionality, and additional interfaces to facilitate communications between the basic configuration 702 and any desired devices and interlaces. For example, a bus interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid stale drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus interface controller 730. Some of the example output devices 742 include a graphics processing unit and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) in one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modifies, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that, includes any of the above functions. The computing device 700 may also be implemented as a personal computer including both laptop computer and non-laptop computer configurations.

Example embodiments may also include methods to provide dynamic storage management in cloud storage synchronization. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be col located with each other, but each can be only with a machine that performs a portion of the program. In other embodiments, the human interaction can be automated such as by pre-selected criteria that may be machine automated.

Figure 8:
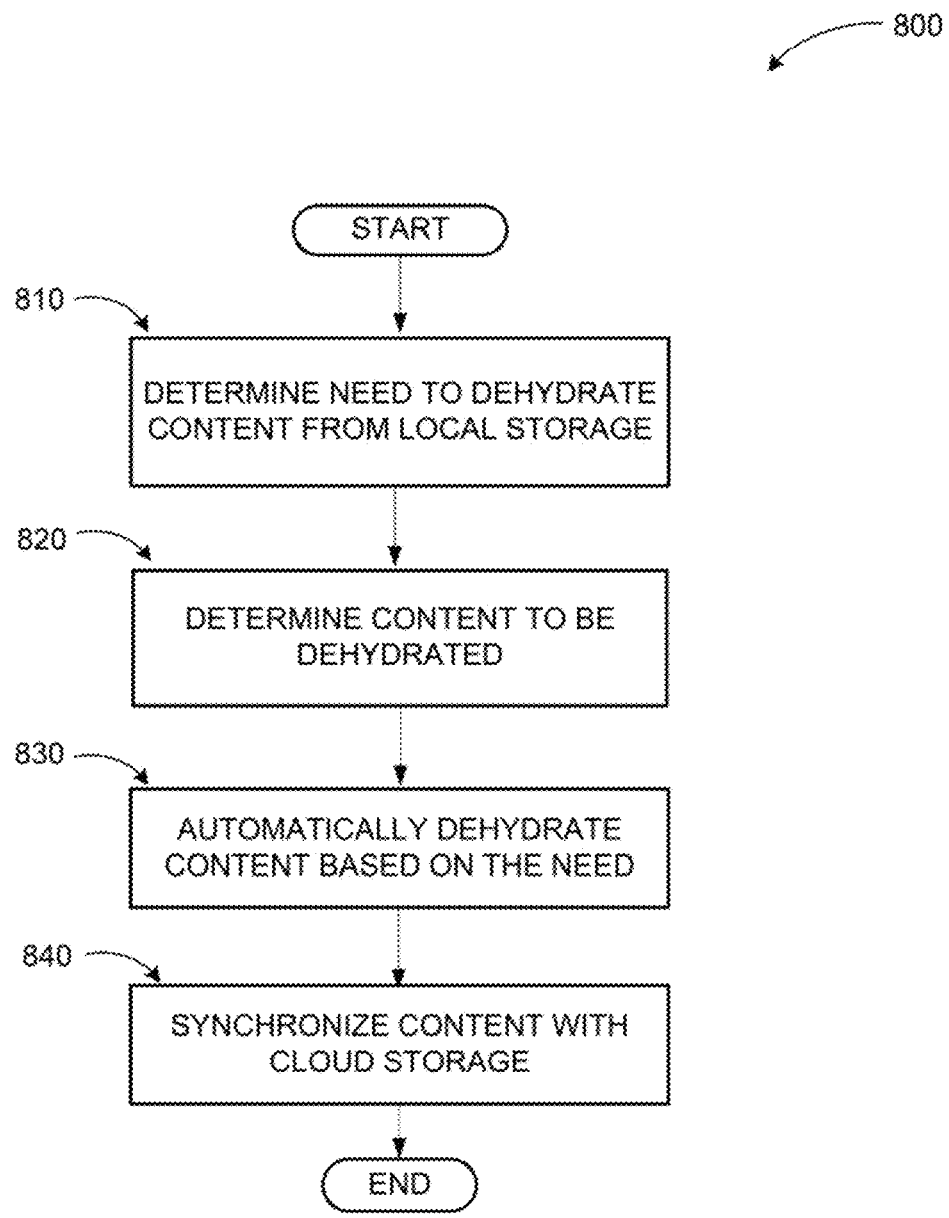
FIG. 8 illustrates a logic flow diagram of a method to provide dynamic storage management in cloud storage synchronization.

FIG. 8 illustrates a logic flow diagram of a method to provide dynamic storage management in cloud storage synchronization, according to embodiments.

Process 800 may be implemented on a computing device, server, or other system. An example system may include a computer communicatively coupled to a cloud storage server with files synchronized between the computer's local storage and the cloud storage.

Process 800 begins with operation 810, where a need to dehydrate content from local storage may be determined based on predefined limits for size of hydrated files in local storage, number of hydrated files in local storage, a comparison of amount of hydrated data in local storage to cloud storage, and similar factors. At operation 820, content to be dehydrated may be determined based on one or more predefined criteria and/or user input. The content (files, folders, etc.) may be determined based on a relevance to the user, access history, size, and comparable factors.

At operation 830, the selected content may be dehydrated based on the needed space at local storage. In some examples, a proactive hydration and dehydration combination may be performed, to other examples, synchronization (hydration) with cloud storage files may be performed at operation 840 following creation of new space through the dehydration process.

The operations included in process 800 are for illustration purposes. Dynamic storage management in cloud storage synchronization may be implemented by similar processes with fewer or additional steps, as well as in different order of operations using the principles described herein. The operations described herein may be executed by one or more processors operated on oneor more computing devices, one or more processor cores, specialized processing devices, and/or general purpose, processors, among other examples.

According to examples, a means for providing dynamic storage management in cloud storage synchronization in described. The means may include a means for determining a need to reduce hydrated content from a local storage; a means for determining one or more files in the local storage to be dehydrated based on one or more policies; a means for dehydrating the one or more files by replacing the one or more files with placeholders that indicate corresponding one or more files in a cloud storage and removing the one or more files in the local storage; and a means for allowing one or more placeholders in the local storage to be hydrated based on the one or more policies.

According to some examples, a method to provide dynamic storage management in cloud storage synchronization in described. The method may include determining a need to reduce hydrated content from a local storage; determining one or more files in the local storage to be dehydrated based on one or more policies; dehydrating the one or more files by replacing the one or more files with placeholders that indicate corresponding one or more files in a cloud storage and removing the one or more files in the local storage; and allowing one or more placeholders in the local storage to be hydrated based on the one or more policies.

According to other examples, determining the need to reduce lite hydrated content from the local storage may include detecting a limit for hydrated files in the local storage being approached or exceeded. The limit tor the hydrated files in the local storage may be based on a size of the hydrated files in the local storage or a number of the hydrated files in the local storage. The limit for the hydrated files in the local storage may also be based on a comparison of a total amount of data in the local storage against a total capacity of the cloud storage. The limit for the hydrated files in the local storage may be received from a user or an administrator through direct input or in form of a policy.

According to further examples, determining the need to reduce the hydrated content from the local storage may include determining the need to reduce the hydrated content heuristically based on a comparison of a total amount hydrated files in the local storage against files in the cloud storage. Determining the one or more files in the local storage to be dehydrated based on the one or more policies may include selecting the one or more files from the hydrated content in the local storage based on one or more of a last access, an access frequency, a relevance, a size, and a type. The method may further include determining a list of eligible files from the hydrated content in the local storage through pro-filtering based on one or more criteria. The method may also include ranking the list of eligible files based on one or more of a size and a timestamp of each file.

According to other examples, a computing device to provide dynamic storage management in cloud storage synchronization is described. The computing device may include a communication interlace configured to facilitate communication between the computing device and a cloud storage service; a memory configured to store instructions; and one or more processors coupled to the memory. The one or more processors, in conjunction with the instructions stored in the memory, may be configured to determine a need to reduce hydrated content from a local storage based on one or more of an explicit limit for hydrated files in the local storage and a heuristic determination based on a comparison of a total amount hydrated files in the local storage against files in the cloud storage; determine one or more files in the local storage to be dehydrated based on one or more policies; and dehydrate the one or more files by replacing the one or more files with placeholders indicating corresponding one or more files in a cloud storage and removing the one or more files in the local storage.

According to some examples, the one or more processors may be configured to determine the need to reduce the hydrated content from the local storage by maintaining a hydrated size field in a synchronization engine database to keep track of the total amount hydrated files in the local storage; updating the hydrate size field in response to hydration of each file in the local storage; and updating the hydrate size field in response to dehydration or removal of each file in the local storage.

According to other examples, the one or more processors may be further configured to in response to completion of synchronization diagnostics, verify the total amount hydrated files; and update the hydrate size field if a discrepancy is detected. The one or more processors may also execute one or more algorithms to determine the one or more files in the local storage to be dehydrated, each algorithm including one or more policies based on a last access, an access frequency, a relevance, a size, or a type. The one or more processors may further consider one or more exceptions to the one or more policies in determining the one or more files in the local storage to be dehydrated. The one or more exceptions may include files that are in use by an application, files designated as not to be dehydrated by a synchronization engine, and files designated as short term by a user or an administrator.

According to further examples, a physical computer-readable memory device with instructions stored thereon to provide symbolic link based placeholders for cloud stored data synchronization is described. The instructions may include determining a need to reduce hydrated content from a local storage based on one or more of an explicit limit for hydrated files in the local storage and a heuristic determination based on a comparison of a total amount hydrated files in the local storage against files in the cloud storage; determining one or more files in the local storage to be dehydrated based on one or more policies, the policies defining rules based on a last access, an access frequency, a relevance, a size, or a type; and dehydrating the one or more files by replacing the one or more files with placeholders indicating corresponding one or more files in a cloud storage and removing the one or more files in the local storage.

According to yet other examples, the relevance may be a score for each hydrated file received from a personalized search application. Determining the need to reduce the hydrated content from the local storage may include adding an offset to the explicit limit. The one or more policies may be applied on a per-folder basis in the local storage. Determining the one or more files in the local storage to be dehydrated may include taking into consideration one or more of an organizational policy, a user input, and an administrator input.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide dynamic storage management in cloud storage synchronization, the method comprising;
in response to receiving a selection from a user designating a first file as an exception to file dehydration, setting a first short term flag for the first file;
determining a need to reduce hydrated content from a local storage storing a plurality of files;
ranking the plurality of files based on a relevance score from a personalized search application that indicates a relevance of each file to a user;
determining a list of files from the plurality of files in the local storage to be dehydrated based on one or more policies, wherein the one or more policies determine the files included in the list based on the ranking, the list of files including the first file;
for each of the files included in the list, determining whether a short term flag designating the particular file as an exception to file dehydration is set;
in response to determining that the first short term flag designating the first file is set, not dehydrating the first file;
in response to determining that no short term flag designating a second file of the files included in the list is set, dehydrating the second file by replacing the second file with a placeholder that indicates a corresponding file in a cloud storage and removing the second file in the local storage; and
allowing one or more placeholders in the local storage to be hydrated based on the one or more policies.

2. The method of claim 1, wherein determining the need to reduce the hydrated content from the local storage comprises:
detecting a limit for hydrated files in the local storage being approached or exceeded.

3. The method of claim 2, wherein the limit for the hydrated files in the local storage is based on one of a size of the hydrated files in the local storage and a number of the hydrated files in the local storage.

4. The method of claim 2, wherein the limit for the hydrated files in the local storage is based on a comparison of a total amount of data in the local storage against a total capacity of the cloud storage.

5. The method of claim 2, wherein the limit for the hydrated files in the local storage is received from one of a user and an administrator.

6. The method of claim 1, wherein determining the need to reduce the hydrated content from the local storage comprises:
determining the need to reduce the hydrated content heuristically based on a comparison of a total amount hydrated files in the local storage against files in the cloud storage.

7. The method of claim 1, wherein determining the one or more files from the plurality of files in the local storage to be dehydrated based on the one or more policies comprises:
selecting the one or more files from the hydrated content in the local storage based on one or more of a last access, an access frequency, a relevance, a size, and a type.

8. The method of claim 7, further comprising:
determining a list of eligible files from the hydrated content in the local storage through pre-filtering based on one or more criteria.

9. The method of claim 8, further comprising:
ranking the list of eligible files based on one or more of a size and a timestamp of each file.

10. The method of claim 1 further comprising stopping, after dehydrating the second file, the dehydration of the files from the list when the need to reduce hydrated content is no longer present.

11. A computing device to provide dynamic storage management in cloud storage synchronization, the computing device comprising:
a communication interface configured to facilitate communication between the computing device and a cloud storage service;
a memory configured to store instructions; and
one or more processors coupled to the memory, wherein the one or more processors, in conjunction with the instructions stored in the memory, are configured to:
in response to receiving a selection from a user designating a first file as an exception to file dehydration, set a first short term flag for the first file;
determine a need to reduce hydrated content from a local storage storing a plurality of files based on one or more of an explicit limit for hydrated files in the local storage and a heuristic determination based on a comparison of a total amount hydrated files in the local storage against files in the cloud storage;
rank the plurality of files based on a relevance score from a personalized search application the indicates a relevance of each file to a user;
determine a list of one or more files from the plurality of files in the local storage to be dehydrated based on one or more policies, wherein the one or more policies determine the files included in the list based on the ranking, the list of files including the first file;
for each of the files included in the list, determine whether a short term flag designating the particular file as an exception to file dehydration is set;
in response to determining that the first short term flag designating the first file is set, not dehydrate the first file; and
in response to determining that no short term flag designating a second file of the files included in the list is set, dehydrate the second file by replacing the second file with a placeholder that indicates a corresponding file in a cloud storage and removing the second file in the local storage.

12. The computing device of claim 11, wherein the one or more processors are configured to determine the need to reduce the hydrated content from the local storage by:
maintaining a hydrated size field in a synchronization engine database to keep track of the total amount hydrated files in the local storage;
updating the hydrated size field in response to hydration of each file in the local storage; and
updating the hydrated size field in response to dehydration or removal of each file in the local storage.

13. The computing device of claim 12, wherein the one or more processors are further configured to:
in response to completion of synchronization diagnostics, verify the total amount hydrated files; and
update the hydrate size field if a discrepancy is detected.

14. The computing device of claim 11, wherein the one or more processors are further configured to:
- execute one or more algorithms to determine the one or more files from the plurality of files in the local storage to be dehydrated, each algorithm including one or more policies based on a last access, an access frequency, a relevance, a size, or a type.

15. The computing device of claim 11, wherein the one or more processors are further configured to:
- consider one or more exceptions to the one or more policies in determining the one or more files in the local storage to be dehydrated.

16. The computing device of claim 15, wherein the one or more exceptions include files that are in use by an application.

17. A physical computer-readable memory device with instructions stored thereon to provide symbolic link based placeholders for cloud stored data synchronization, the instructions comprising:
- in response to receiving a selection from a user designating a first file as an exception to file dehydration, setting a first short term flag for the first file;
- determining a need to reduce hydrated content from a local storage storing a plurality of files based on one or more of an explicit limit for hydrated files in the local storage and a heuristic determination based on a comparison of a total amount of hydrated files in the local storage against files in the cloud storage;
- ranking the plurality of files based on a relevance score from a personalized application that indicates a relevance of each file to a user;
- determining a list of files from the plurality of files in the local storage to be dehydrated based on one or more policies, wherein the policies determine the files included in the list based on a last access, an access frequency, a size, a type, or the ranking, the list of files including the first file;
- for each of the files included in the list, determining whether a short term flag designating the particular file as an exception to file dehydration is set;
- in response to determining that the first short term flag designating the first file is set, not dehydrating the first file and removing the first file from the list; and
- in response to determining that no short term flag designating a second file of the files included in the list is set, dehydrating the second file not associated with a respective short term flag by replacing the second file with a placeholder indicating a corresponding file in a cloud storage and removing the second file from the local storage.

18. The computer-readable memory device of claim 17, where in determining the need to reduce the hydrated content from the local storage comprises adding an offset to the explicit limit.

19. The computer-readable memory device of claim 17, wherein the one or more policies are applied on a per-folder basis in the local storage.

20. The computer-readable memory device of claim 19, wherein determining the one or more files in the local storage to be dehydrated comprises taking into consideration one or more of an organizational policy, a user input, and an administrator input.

* * * * *